UNITED STATES PATENT OFFICE.

ALEXANDER CLASSEN, OF AACHEN, GERMANY.

PROCESS OF CONVERTING CELLULOSE INTO SUGAR.

SPECIFICATION forming part of Letters Patent No. 654,518, dated July 24, 1900.

Application filed January 29, 1900. Serial No. 3,201. (No specimens.)

*To all whom it may concern:*

Be it known that I, ALEXANDER CLASSEN, a citizen of Germany, residing at Aachen, in the Empire of Germany, have invented a certain new and useful Process for Converting Cellulose into Fermentable Sugar, (for which I have made application for patents in the following countries, viz: Germany, September 21, 1899; Denmark, December 4, 1899; Sweden, December 8, 1899; Finland, December 22, 1899; France, January 3, 1900, and Belgium, January 3, 1900,) of which the following is a specification.

My invention relates to a process by which the conversion of wood or the like into sugar may be effected in fifteen minutes at a temperature of 120° to 145° centigrade by subjecting the material to the joint action of sulphurous acid and sulphuric acid. The best temperature depends on the species of wood used. Birch, for example, may be converted into sugar at about 130° centigrade, and fir at about 145° centigrade. Below this temperature the yield is smaller. The process may be conducted with a previously-made mixture of sulphurous acid and sulphuric acid containing two per cent. or more of sulphurous acid and about 0.2 per cent. of sulphuric acid, or, what is decidedly preferable, by starting with sulphurous acid alone and causing the sulphuric acid to be formed in the nascent state. When the formation of sulphuric acid is caused to occur mainly at the temperature which has found to be best for the species of wood under treatment, a minimum yield of about three hundred grams of glucose (tested by reduction of Fehling's solution) per kilo of dry wood is obtained, of which sugar eighty per cent. (sometimes ninety per cent.) is fermentable, corresponding with about one hundred and twenty grams of absolute alcohol.

That by far the greater portion of yield of sugar is due to the joint action of sulphurous and sulphuric acid is proved by the fact that when the same species of material is treated under the same conditions with sulphurous acid alone, the air having been completely removed and being carefully excluded from the vessel, the yield of sugar is only half that obtained when both acids are used. As to the fermentability of such sugar no examination has been made.

The formation of sulphuric acid in the nascent state may be effected in either of two ways—first, by the action of atmospheric air or other gaseous mixture rich in oxygen; second, by the action of oxidants capable of oxidizing sulphurous acid to sulphuric acid, such as peroxides, permanganates, manganates, and the like. The best yield is obtained when the formation of the sulphuric acid is effected by introducing air or other gaseous mixture containing oxygen or introducing one of the aforesaid oxidants either dissolved or suspended in water into the vessel as soon as the best temperature for conversion is reached and then blowing off after ten to fifteen minutes.

Estimations of the sulphuric acid formed by the action of the air introduced show that the converted solution contains 0.2 to 0.5 per cent. of $H_2SO_4$.

The advantages of the foregoing process are so prominent that they need not be emphasized. Apart from the great yield in fermentable product, which is regularly obtained without any difficulty, by far the greater part of sulphurous acid (which can be supplied at a low price from ore-roasting furnaces) can be recovered in order to be utilized again for the same or other purposes by merely opening the valve at the end of the operation and conducting the gas into water as it blows off. In addition to this the temperature is considerably lower and can be attained more easily than in Simonsen's process, and the quantity of free acid which need be neutralized is on the average smaller than in the usual processes; but facts of great importance are that the fermentation of the sugar by means of yeast proceeds in the same way as with commercial glucose under similar conditions of concentration and that the solution of the converted sawdust after saturation with sulphurous acid can be utilized again for the conversion of more sawdust without any injury to the subsequent fermentation. In this way it is possible to produce a solution containing ten per cent. of sugar which is sufficiently concentrated for fermentation, so that the cost of concentration of the attenuated solution obtained by a single operation is avoided. In this way the process differs especially from all those hitherto known, as it is a known fact that the action of dilute sulphuric acid, both in open and in closed vessels, gives rise to products which more or less hinder fermentation.

The great technical advantage alluded to, consisting in the repeated utilization of the same liquid for the conversion of fresh material, has not been obtained hitherto by any process, for the reason that the substances referred to and which are injurious to fermentation would be increased by such repetition.

For the mixture of sulphurous acid and sulphuric acid in the foregoing description may be substituted a mixture of sulphurous acid and hydrochloric acid, the latter containing 0.2 to two per cent. of acid, hydrochloric acid being for this purpose equivalent to sulphuric acid.

Having thus described the nature of this invention and the best means I know of carrying the same into practical effect, I claim—

The process for converting cellulose into sugar which consists in heating the cellulose in a closed vessel at a temperature of 120° to 145° centigrade with a solution containing sulphurous acid and sulphuric acid, substantially as described.

In testimony whereof I have hereunto set my hand in presence of two subscribing witnesses.

ALEXANDER CLASSEN.

Witnesses:
C. E. BRUNDAGE,
J. SCOTT.